(12) United States Patent
Lind et al.

(10) Patent No.: US 6,260,571 B1
(45) Date of Patent: Jul. 17, 2001

(54) INFLATION VALVE ASSEMBLY FOR LIFERAFTS

(75) Inventors: John R. Lind, Burnsville; Robert L. Swanson, Ham Lake, both of MN (US)

(73) Assignee: Survival Engineering, Inc., Burnsville, MN (US)

( * ) Notice: Subject to any disclaimer, the term of this patent is extended or adjusted under 35 U.S.C. 154(b) by 0 days.

(21) Appl. No.: 09/211,580

(22) Filed: Dec. 14, 1998

(51) Int. Cl.$^7$ .................................................. F16K 17/14
(52) U.S. Cl. ........................................... 137/68.3; 137/580
(58) Field of Search ........................... 137/68.29, 68.3, 137/580; 222/5; 285/190

(56) References Cited

U.S. PATENT DOCUMENTS

| | | | |
|---|---|---|---|
| 1,782,020 | * 11/1930 | Allen | 137/68.3 |
| 1,921,411 | * 8/1933 | Johann | 137/68.3 |
| 2,036,710 | * 4/1936 | Mapes | 137/68.3 |
| 2,047,049 | * 7/1936 | Allen | 137/68.3 |
| 2,400,658 | * 5/1946 | Shepherd | 285/190 |
| 2,511,495 | * 6/1950 | Crot | 285/190 |
| 2,732,169 | 1/1956 | Matteo | 251/148 |
| 3,059,814 | * 10/1962 | Poncel | 137/68.3 |
| 3,402,253 | * 9/1968 | McCracken | 285/190 |
| 4,384,591 | 5/1983 | Tan | 137/322 |
| 4,672,998 | * 6/1987 | Kozak | 285/190 |
| 4,955,643 | 9/1990 | Bona et al. | 285/190 |
| 4,959,034 | 9/1990 | Wass | 441/41 |
| 5,188,142 | * 2/1993 | Lind et al. | 137/223 |
| 5,533,764 | 7/1996 | Williamson | 285/21 |
| 5,564,478 | 10/1996 | Weinheimer et al. | 141/19 |
| 5,607,189 | 3/1997 | Howeth | 285/39 |
| 5,694,976 | * 12/1997 | Frye-Hammelmann | 137/580 |
| 6,007,109 | * 12/1999 | Schoetz | 285/190 |
| 6,056,325 | * 5/2000 | Bernard | 285/39 |
| 6,070,917 | * 6/2000 | Wiebe | 285/272 |
| 6,086,112 | * 7/2000 | Schofield | 285/98 |

FOREIGN PATENT DOCUMENTS

770276 * 3/1957 (GB) .................................. 137/68.29

* cited by examiner

Primary Examiner—Denise L. Ferensic
Assistant Examiner—K. B. Rinehart
(74) Attorney, Agent, or Firm—Zarley, McKee, Thomte, Voorhees & Sease

(57) ABSTRACT

A raft inflation valve has an elongated valve body with first and second ends, and a center bore. A cylindrical member has first and second ends slidably mounted in the center bore. A spring urges the cylindrical member towards the first end of the valve body. An arm is pivotally secured to the first end of the valve body to engage the first end of the cylinder member, and to move the cylinder member towards the second end of the valve body. A cutting element is on the second end of the cylinder member. A pressure gas filled vessel is secured to the second end of the valve body and has a gas discharge port. A seal member is on the gas discharge port of the vessel and is punctured by the cutting element when the arm moves the cylinder member towards the second end of the valve body. A space is in the center bore around the second end of the cylinder member. An annular groove is on the outside of the valve body in communication with the space. O-rings are above and below the annular groove and equal gas pressure is exerted against each O-ring. A coupling having a center bore rotatably extends over the annular groove, and has a gas outlet. A gas coupling is on the gas outlet for attachment to a gas fitting on a raft structure.

6 Claims, 4 Drawing Sheets

US 6,260,571 B1

INFLATION VALVE ASSEMBLY FOR LIFERAFTS

BACKGROUND OF THE INVENTION

Emergency liferafts are available for inflation and ejection from military aircraft and the like. An uninflated raft and an inflation assembly are typically ejected from the aircraft into the water before impact, or ejected into the water during rescue operations. The inflation assembly normally includes a disposable pressure vessel filled with gases such as carbon dioxide or nitrogen, accompanied by a suitable valve which, when opened, will free the gas for raft inflation purposes. A pivotal activity arm on a valve has been used for purposes of punching a seal on the gas filled vessel to effect the inflation process. The pivotal action is inducted by a lanyard secured to the arm and the aircraft. Bending of the activity arm is common when ejection takes place and the valve mechanism will not pivot adequately to align itself with the plane in which the lever arm is intended to pivot.

It is therefore a principal object of this invention which will provide a raft inflation valve assembly which has an activity arm on a valve cylinder which is freely movable and rotatable within a valve body.

A further object of this invention is to provide a raft inflation valve that has an inflation valve cylinder in a valve body that is pressure balanced and free floating within the valve body, and which will maintain an alignment of 180° with the activation arm so that the arm will not bend or become bent.

These and other objects will be apparent to those skilled in the art.

SUMMARY OF THE INVENTION

A raft inflation valve has an elongated valve body with first and second ends, and an elongated center bore. A cylindrical member has first and second ends slidably mounted in the center bore. A spring is secured to the cylinder member and yieldingly urges the cylindrical member towards the first end of the valve body. An arm is pivotally secured to the first end of the valve body and is positioned to engage in a first position the first end of the cylinder member, and to move the cylinder member towards the second end of the valve body when in a second position, whereupon the spring is compressed. A cutting element is on the second end of the cylinder member. A pressure gas filled vessel is secured to the second end of the valve body and has a gas discharge port normally adjacent the cutting element.

A seal member is on the gas discharge port of the vessel in the path of the cutting element to be punctured when the arm moves the cylinder member towards the second end of the valve body. A space is in the center bore around the second end of the cylinder member. An annular groove is on the outside of the valve body in communication with the space at locations 180° on opposite sides of the space. O-rings are above and below the annular groove and equal gas pressure is exerted against each O-ring.

A coupling having a center smooth bore rotatably extends over the annular groove, and has a gas outlet in communication with the space. A gas coupling is on the gas outlet for attachment to a gas fitting on a raft structure.

DESCRIPTION OF THE PREFERRED EMBODIMENT

Figure 3:
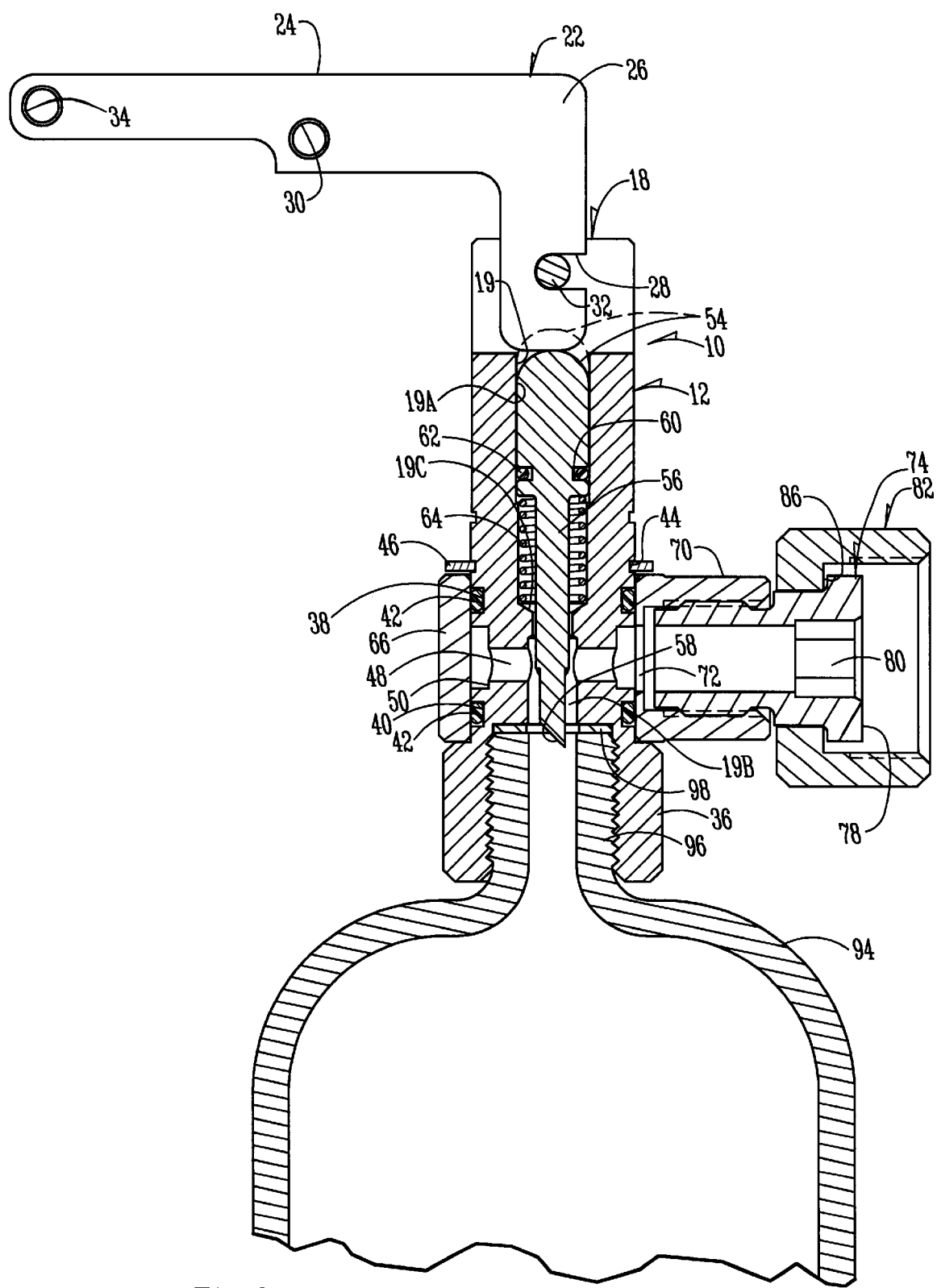
FIG. 3 is a view similar to FIG. 2 but shows the actuation arm in an operational position whereby the gas seal in the gas laden vessel is punctured.
Figure 4:
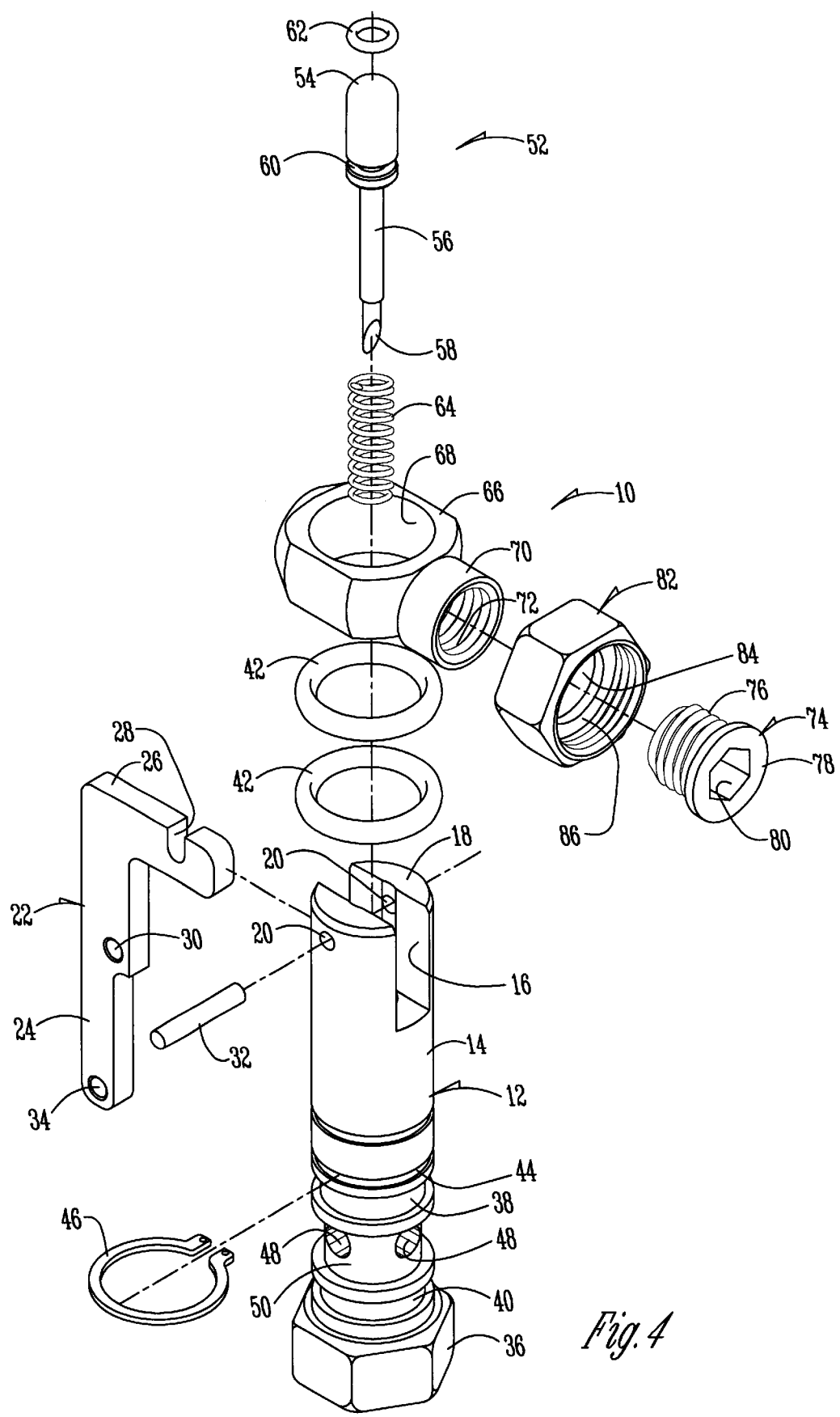
FIG. 4 is an exploded perspective view of the components of the raft inflation valve.

The valve 10 (FIG. 4) includes a valve body 12 including a cylindrical portion 14. A slot 16 is formed in the upper end 18 of the cylindrical portion 14 and has a center bore 19 (FIG. 3). Center bore 19 is comprised of an upper bore portion 19A and a lower portion 19B with a shoulder 19C appears therebetween (FIG. 3). Aligned apertures 20 (FIG. 4) are horizontally aligned in the upper end of cylindrical portion 14 adjacent slots 16 (FIG. 4).

An inverted L-shaped lever arm 22 (FIGS. 1–4) has a vertical arm portion 24 and a horizontal arm portion 26. A notch 28 appears in arm portion 26 (FIG. 4). An aperture 30 is located at the midpoint of arm 24. A pin 32 extends through the apertures 20 and aperture 30 to pivotally secure the arm 22 to the cylindrical portion 14 (FIG. 4). Aperture 34 in the lower or outer end of arm 24 is adapted to receive one end of lanyard 35 (FIG. 1) with the other end of the lanyard being secured to the aircraft (not shown) which might be deploying the described structure.

A nut head 36 is formed on the lower end of valve body 12 and has internal threads. Two annular grooves 38 and 40 (FIG. 4) are formed in the valve body 12. O-rings 42 are located in spaced annular grooves 38 and 40. A clip 46 (FIG. 4) is adapted to be received within annular groove 44 for purposes to be described hereafter. A horizontal bore 48 extends across valve body 12 (FIG. 3) and terminates in an annular groove 50 of reduced diameter.

A spring pin 52 (FIG. 4) has a rounded upper end 54 and a firing pin 56 at its lower end. The lower end of firing pin 56 terminates in pointed lower end 58. An annular groove 60 in pin 52 receives O-ring 62 to yieldingly seal the spring pin within bore portion 19A. A compression spring 64 extends around firing pin 56 (FIG. 3).

Figure 2:
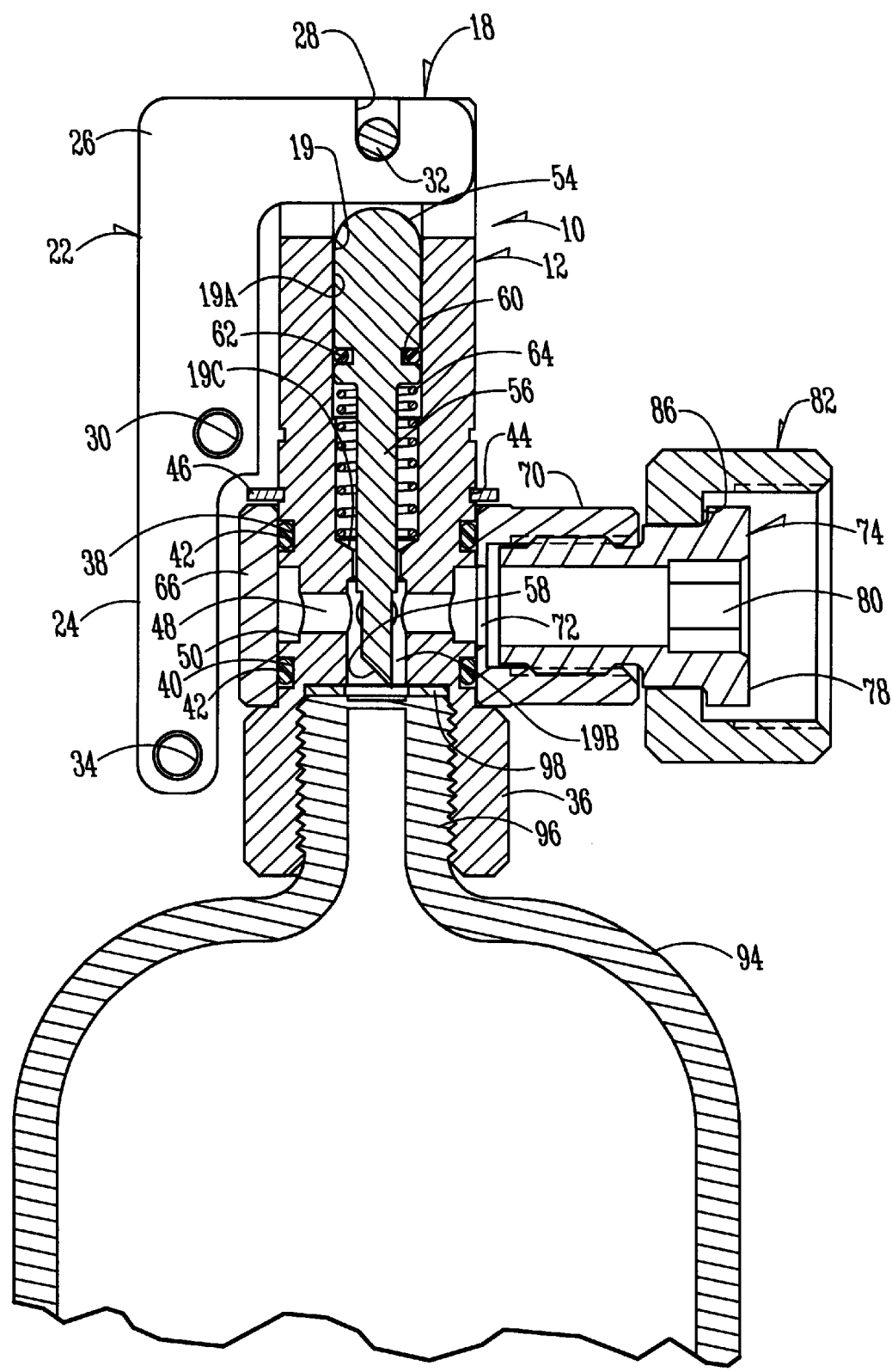
FIG. 2 is a partial sectional view of the raft inflation valve of this invention attached to a compressed gas vessel; the valve of FIG. 2 is shown in its closed and dormant condition.

A coupling 66 (FIG. 4) has a smooth center bore 68 that rotatably embraces valve body 12. Bore 68 covers groove 50 and O-rings 42 As shown in FIGS. 2 and 3, the clip 46 in annular groove 44 secures the coupling 66 from slidable movement on the valve body 12 and yieldingly holds the coupling 66 against the nut head 36. The coupling 66 has an internally threaded outlet 70 which has an open end 72 (FIG. 3) which is thereupon in communication with horizontal bore 48 and annular groove 50. A connecting plug 74 (FIG. 4) has a threaded outer surface 76 to permit it to be threaded into the outlet 70. An enlarged outer shoulder 78 on plug 74 has a center bore 80. As shown in FIG. 4, a coupling nut 82 is internally threaded and has a center opening 84 terminating in a shoulder 86 (FIGS. 3 and 4).

Figure 1:
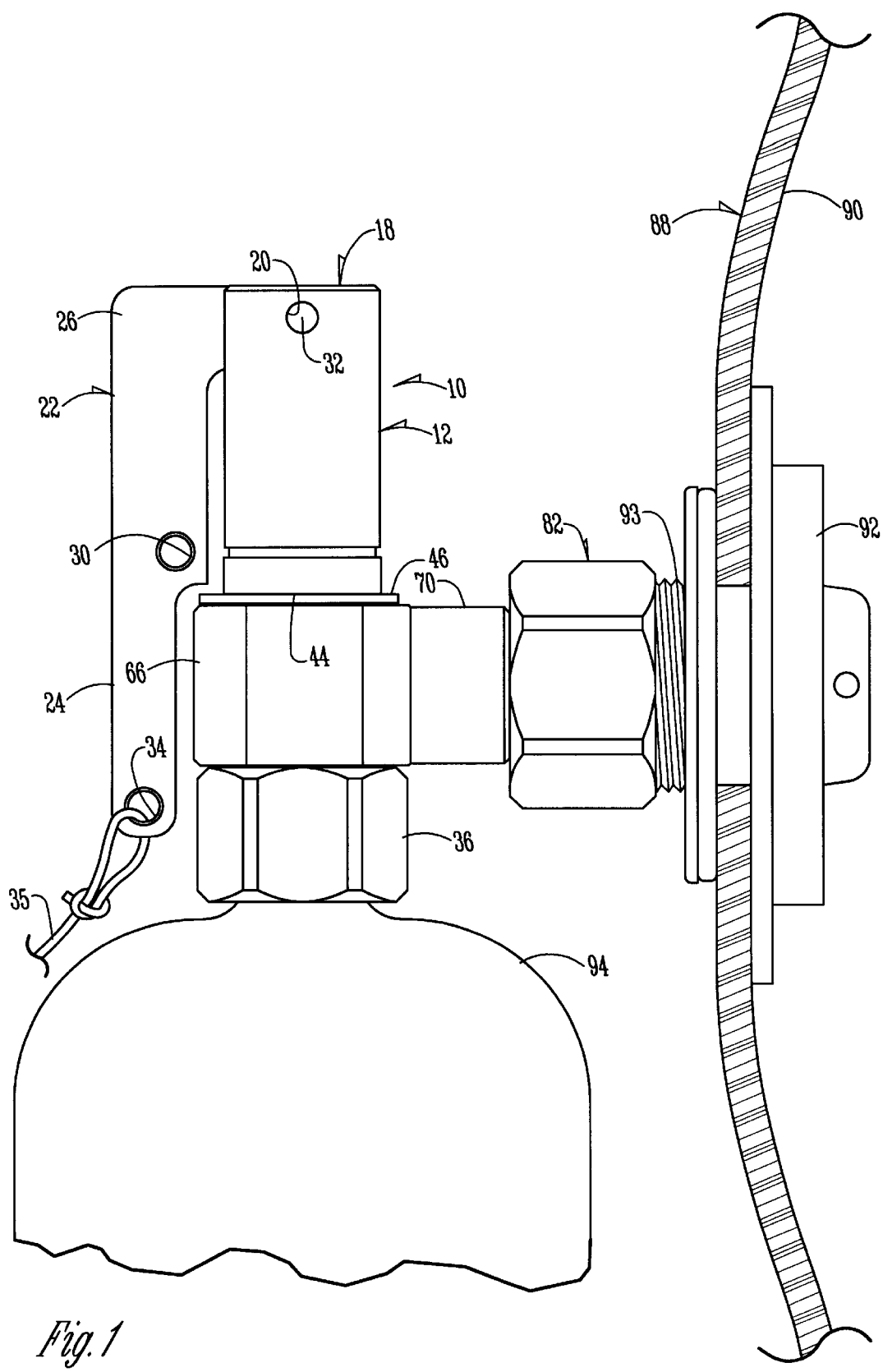
FIG. 1 is a partial sectional view of the device of this invention attached to an inflatable liferaft.

A liferaft 88 of conventional construction has an interior 90 and a coupling 92 which is threaded into the coupling nut 82 (FIG. 1).

A gas pressure vessel or container 94 (FIG. 1) has a threaded outlet end 96 which is threadably received into nut head 36. A metal barrier membrane 98 covers the outlet end 96. This membrane 98 is suitable to seal the pressurized gas within vessel 94 under normal conditions, but as will be described hereafter, the membrane 98 can be pierced by the pointed lower end 58 of firing pin 56 when the device is operational.

In operation, the device of FIG. 2 is ejected from an aircraft under emergency conditions. With one end of the lanyard 35 secured to the aircraft and the other end secured to the lower end of arm 24 of L-shaped lever arm 22, the arm 22 is moved from the positions of FIGS. 1 and 2 to the position of FIG. 3. In the position of FIG. 3, the arm 22 has pivoted about pins 32 and forcibly exerts a downward pressure on the rounded upper end 54 of spring pin 52. This serves to compress spring 64 to allow the structure 52 to slide downwardly in the bore portion 19A. This permits the pointed lower end 58 of the firing pin 56 to move from the position of FIG. 2 to the position of FIG. 3 wherein the firing pin pierces the metal barrier membrane 98.

This allows an outrush of compressed gas from the outlet end 96 of the gas pressure vessel 94. The gas moves upwardly through bore portion 19B and moves into bore 48 and annular groove 50. At this momentary stage, the lateral pressure on body member 12 is completely equalized around its outer surface since the gas pressure exists not only in bore 48 but also in the annular groove 50. This gas pressure also equally exerts itself within the center smooth bore 68 of coupling 66 which permits the coupling to freely pivot about the center axis of the body member 12. Thus, any rotation of the coupling 66 around the center axis of body member 12 will not bend the L-shaped lever arm 22 to cause it to malfunction. Equal gas pressure is exerted on O-rings 42.

The compressed gas within bore 48 and annular groove 50 moves laterally outwardly through outlet 70 and through connecting plug 74 into the interior of the raft 88 to which it is connected. The swivel connection afforded by connecting plug 74 with respect to coupling 66 permits rotation between the structure of FIG. 3 and the raft 88 to the extent that swivel activity is precipitated.

The foregoing structure allows the valve assembly to maintain an alignment of 180° relationship to the lever arm 22 during actuation and free deployment of the liferaft. The balanced gas pressure feature afforded by bores 48 and annular groove 50 allows the coupling 66 to pivot freely even when pressurized because the gas pressures on the O-rings 42 have been equalized. While this general concept is disclosed in U.S. Pat. No. 5,188,142, this feature greatly enhances the swivel characteristics of this valve assembly and serves to protect the assembly from malfunction by avoiding any distortion of the lever arm 22.

It is therefore seen that this invention will achieve at least all of its stated objectives.

What is claimed is:

1. A raft inflation valve, comprising, an elongated valve body having first and second ends, and an elongated center bore, a cylinder member having first and second ends slidably mounted in the center bore, a spring secured to the cylinder member and yieldingly urging the cylindrical member towards the first end of the valve body, an arm pivotally secured directly to the first end of the valve body and positioned to engage in a first position the first end of the cylinder member, and to move the cylinder member towards the second end of the valve body when in a second position whereupon the spring is compressed, a cutting element on the second end of the cylinder member, a pressurized gas filled vessel secured directly to the second end of the valve body and having a gas discharge port normally adjacent the cutting element, a seal membrane on the gas discharge port of the vessel in the path of the cutting element to be punctured when the arm moves the cylinder member towards the second end of the valve body, a space in the center bore around the second end of the cylinder member, an annular groove on the outside of the valve body in communication with the space at locations 180° on opposite sides of the space, a coupling having a smooth center bore rotatably coupled to the valve body for free rotation between the valve body and coupling, and extending over the annular groove, and having a gas outlet in communication with the space, and a gas coupling on the gas outlet for attachment to a gas fitting on a raft structure.

2. The inflation valve of claim 1 wherein the arm pivotally secured to the first end of the valve body is an L-shaped arm which has a first arm portion pivotally secured to the first end of the valve body and a second arm portion at right angles to the first arm portion which dwells along the side of the valve body, with the first arm portion adapted to move against the upper end of the cylinder member when the L-shaped arm member is rotated 90° from its normal inoperative position to cause the cutting element on the second end of the cylindrical member to puncture the seal membrane on the gas discharge port of the vessel.

3. The inflation valve of claim 1 wherein the coupling has a longitudinal axis at right angles to the longitudinal axis of the valve body.

4. The inflation valve of claim 1 wherein a pair of seal rings are located above and below the annular groove on the outside of the valve body to balance the gas pressure on the seal rings.

5. The valve of claim 1 wherein the cylinder member is rotatable with the valve body and the coupling is fully rotatable on the valve body.

6. The valve of claim 1 wherein the coupling and the valve body are free from intermeshing threads.

* * * * *